(12) United States Patent
Yan et al.

(10) Patent No.: US 8,513,670 B2
(45) Date of Patent: Aug. 20, 2013

(54) PIXEL STRUCTURE AND PIXEL CIRCUIT HAVING MULTI-DISPLAY MEDIUMS

(75) Inventors: Jing-Yi Yan, Hsinchu County (TW); Yen-Shih Huang, Hsinchu (TW); Chen-Wei Lin, Kaohsiung (TW); Hua-Chi Cheng, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 515 days.

(21) Appl. No.: 12/911,734

(22) Filed: Oct. 26, 2010

(65) Prior Publication Data

US 2011/0285610 A1 Nov. 24, 2011

(30) Foreign Application Priority Data

May 18, 2010 (TW) .............................. 99115782 A

(51) Int. Cl.
| | |
|---|---|
| H01L 27/14 | (2006.01) |
| H01L 29/04 | (2006.01) |
| H01L 29/15 | (2006.01) |
| H01L 31/036 | (2006.01) |
| H01L 33/00 | (2010.01) |
| H01L 21/00 | (2006.01) |
| G09G 3/32 | (2006.01) |
| G09G 3/36 | (2006.01) |

(52) U.S. Cl.
USPC ................. 257/72; 257/96; 257/97; 438/47; 345/82; 345/92

(58) Field of Classification Search
USPC ................... 257/72, 96, 97; 438/47; 345/82, 345/92
See application file for complete search history.

(56) References Cited

U.S. PATENT DOCUMENTS

| | | | |
|---|---|---|---|
| 6,014,189 A | 1/2000 | Budd et al. | |
| 6,611,097 B1 * | 8/2003 | Hanahara et al. | 313/506 |
| 7,309,880 B2 * | 12/2007 | Terashita | 257/98 |
| 2003/0193457 A1 * | 10/2003 | Wang et al. | 345/84 |
| 2004/0075628 A1 | 4/2004 | Chien et al. | |
| 2006/0119263 A1 | 6/2006 | Chen et al. | |
| 2006/0250558 A1 | 11/2006 | Burns et al. | |
| 2007/0001956 A1 * | 1/2007 | Yeh et al. | 345/92 |
| 2007/0120478 A1 | 5/2007 | Lee et al. | |
| 2007/0131944 A1 | 6/2007 | Hu et al. | |
| 2007/0160813 A1 * | 7/2007 | Hu et al. | 428/195.1 |
| 2007/0194308 A1 | 8/2007 | Kuo | |
| 2008/0303982 A1 * | 12/2008 | Jin et al. | 349/69 |

* cited by examiner

*Primary Examiner* — Fernando L Toledo
*Assistant Examiner* — Karen Kusumakar
(74) *Attorney, Agent, or Firm* — Jianq Chyun IP Office

(57) ABSTRACT

A pixel structure and a pixel circuit having multi-display mediums are provided. A storage capacitor and a first display medium are disposed in different layers, so as to overlap the storage capacitor with a pixel electrode of the first display medium. Accordingly, an area of the first display medium can be increased for enlarging an aperture ratio of the pixel. Furthermore, because a third pixel electrode is disposed in a conductive layer, the third pixel electrode can control/drive a second display medium under a substrate.

26 Claims, 14 Drawing Sheets

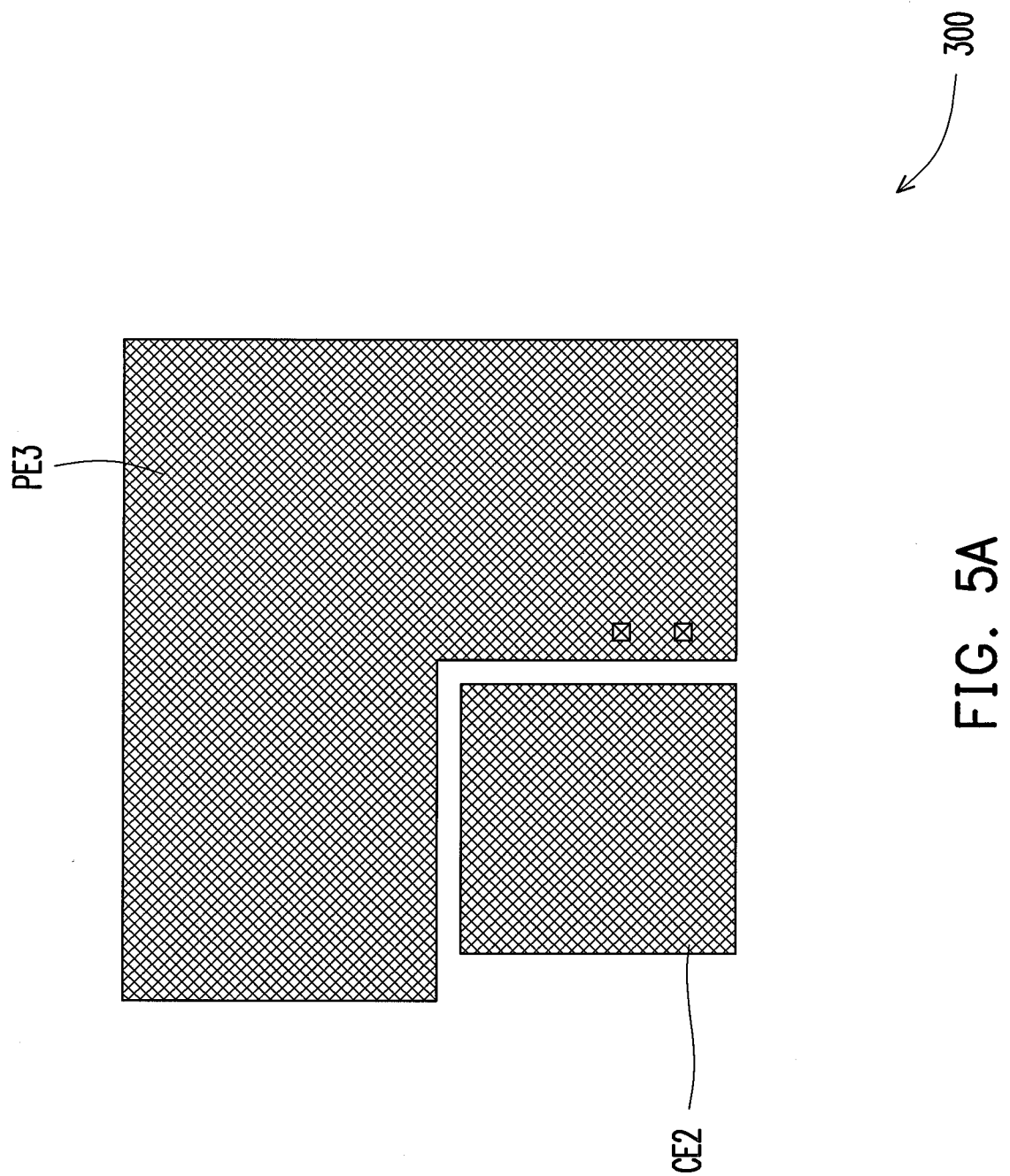

PIXEL STRUCTURE AND PIXEL CIRCUIT HAVING MULTI-DISPLAY MEDIUMS

CROSS-REFERENCE TO RELATED APPLICATION

This application claims the priority benefit of Taiwan application serial no. 99115782, filed on May 18, 2010. The entirety of the above-mentioned patent application is hereby incorporated by reference herein and made a part of this specification.

TECHNICAL FIELD

The disclosure relates generally to a display panel, and more particularly to a pixel structure and a pixel circuit having multi-display mediums.

BACKGROUND

As technology and industrial design rapidly advance ahead, a display panel design capable of driving two display mediums or a double-sided display has become more important. In such a display panel design, while one display medium displays main information, other data can be presented by another display medium. Conventionally, two different display panels are attached together, although such a design is severely limiting.

SUMMARY

A pixel circuit having multi-display mediums is introduced herein for driving a plurality of display mediums.

The disclosure further introduces a pixel structure for enlarging an aperture ratio of a display.

According to an embodiment of the disclosure, a pixel structure includes a substrate, a first pixel electrode, a second pixel electrode, a third pixel electrode, a fourth pixel electrode, a first display medium layer, a second display medium layer, a first thin film transistor (TFT), a second TFT, and a storage capacitor. The first pixel electrode and the second pixel electrode are disposed in parallel on the substrate. The first display medium layer is disposed between the first pixel electrode and the second pixel electrode. The third pixel electrode and the fourth pixel electrode are disposed in parallel with the substrate. The second display medium layer is disposed between the third pixel electrode and the fourth pixel electrode. The first TFT is disposed on the substrate, in which a control terminal of the first TFT is electrically connected to a scan line, a first terminal of the first TFT is electrically connected to a data line, and a second terminal of the first TFT is electrically connected to the third pixel electrode. The second TFT is disposed on the substrate, in which a control terminal of the second TFT is electrically connected to the second terminal of the first TFT, and a first terminal of the second TFT is electrically connected to the first pixel electrode. The storage capacitor is disposed on the substrate. On a vertical direction of the substrate, the first pixel electrode overlaps a portion or all of the storage capacitor. The storage capacitor has a first capacitor electrode and a second capacitor electrode, in which the first capacitor electrode is electrically connected to the second terminal of the first TFT.

According to an embodiment of the disclosure, a pixel structure includes a substrate, a common conductive layer, a first pixel electrode, a second pixel electrode, a first display medium layer, a first TFT, a second TFT, and a storage capacitor. The common conductive layer is disposed in the second conductive layer. The first pixel electrode is disposed in the fourth conductive layer. The second pixel electrode is disposed in the fifth conductive layer, in which the second pixel electrode overlaps a portion or all of the first pixel electrode on a vertical direction of the substrate. The first display medium layer is disposed in a fourth insulating layer and between the first pixel electrode and the second pixel electrode. The storage capacitor has a first capacitor electrode and a second capacitor electrode. On a vertical direction of the substrate, the first pixel electrode overlaps a portion or all of the storage capacitor. Moreover, the second capacitor electrode is disposed in the common conductive layer. The first TFT has a control terminal electrically connected to the scan line, a first terminal electrically connected to the data line, and a second terminal electrically connected to the first capacitor electrode. The second TFT has a control terminal electrically connected to the second terminal of the first TFT, a first terminal electrically connected to the first pixel electrode, and a second terminal of the second TFT is electrically connected to the common conductive layer.

According to an embodiment of the disclosure, a pixel circuit having multi-display mediums includes a first display medium device, a second display medium device, a scan line, a data line, a first TFT, a second TFT, and a storage capacitor. The first display medium device has the first pixel electrode and the second pixel electrode. The second display medium device has the third pixel electrode and the fourth pixel electrode. The first TFT has a control terminal electrically connected to the scan line, a first terminal electrically connected to the data line, and a second terminal electrically connected to the third pixel electrode. The second TFT has a control terminal electrically connected to the second terminal of the first TFT, and a first terminal electrically connected to the first pixel electrode. The storage capacitor has a first capacitor electrode and a second capacitor electrode, in which the first capacitor electrode is electrically connected to the second terminal of the first TFT.

In summary, the pixel structure and the pixel circuit designed according to embodiments of the disclosure can drive two display mediums while enlarging the aperture ratio.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

FIGS. 5A-5D are schematic views illustrating a fabrication process of the pixel structure depicted in FIG. 3.

DESCRIPTION OF EMBODIMENTS

Figure 1:
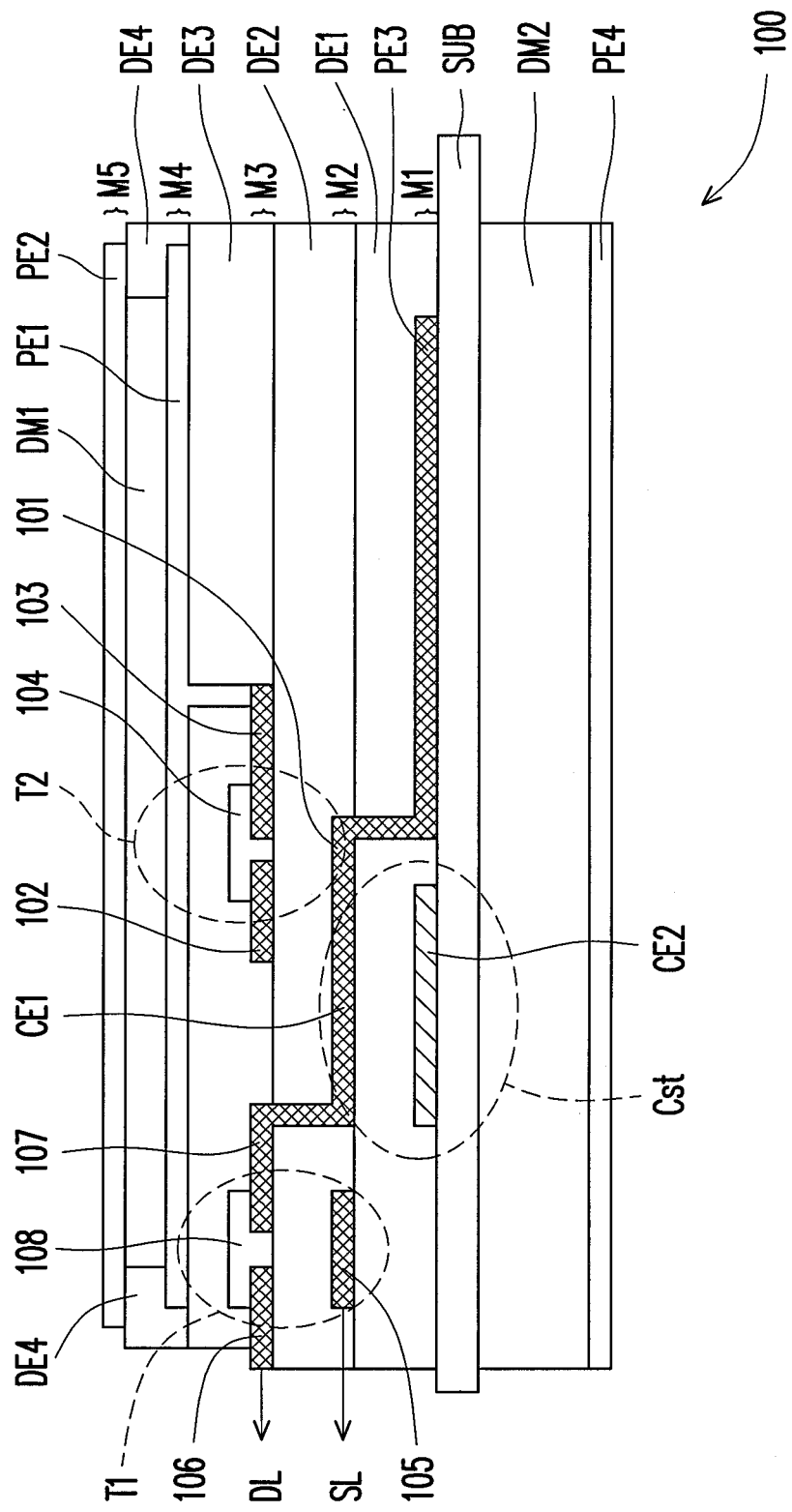
FIG. 1 is a schematic cross-sectional view illustrating a pixel structure having multi-display mediums according to an exemplary embodiment.

FIG. 1 is a schematic cross-sectional view illustrating a pixel structure 100 having multi-display mediums according to an exemplary embodiment. An inverted coplanar structure is presented in FIG. 1. However, FIG. 1 may also be applicable in basic structures such as directly staggered, coplanar, and inverted staggered, or other derivative structures.

The pixel structure 100 includes a substrate SUB, a first pixel electrode PE1, a second pixel electrode PE2, a third pixel electrode PE3, a fourth pixel electrode PE4, a first display medium layer DM1, a second display medium layer DM2, a scan line SL, a data line DL, a first thin film transistor (TFT) T1, a second TFT T2, and a storage capacitor Cst. The first pixel electrode PE1 and the second pixel electrode PE2 are disposed in parallel on the substrate SUB, whereas the first display medium layer DM1 is disposed between the first pixel electrode PE1 and the second pixel electrode PE2. In the present embodiment, the first pixel electrode PE1 is disposed on a fourth conductive layer M4, the first display medium layer DM1 is disposed in a via of a fourth insulating layer DE4, and the second pixel electrode PE2 is disposed on a fifth conductive layer M5.

According to a voltage or a current between the first pixel electrode PE1 and the second pixel electrode PE2, a display medium of the first display medium layer DM1 can be determined. For example, the first display medium layer DM1 may be a light emitting diode (LED), an organic light emitting diode (OLED), or a liquid crystal. The first display medium layer DM1 may also include a bistable (or multi-stable) display medium, such as electronic ink (E-Ink), a cholesteric liquid crystal, an electrophoretic display (EPD), or an electrowetting display (EWD).

The third pixel electrode PE3 and the fourth pixel electrode PE4 are disposed in parallel on the substrate SUB, whereas the second display medium layer DM2 is disposed between the third pixel electrode PE3 and the fourth pixel electrode PE4. Additionally, a user of the present embodiment may determine the dispositions of the pixel electrodes PE3 and PE4, as well as the display medium layer DM2 in accordance with a design requirement. For example, the pixel electrodes PE3 and PE4 and the display medium layer DM2 may be disposed on the substrate SUB. In other words, the pixel electrodes PE3 and PE4 and the display medium layer DM2 may be disposed between the pixel electrode PE1 and the substrate SUB. According to a voltage or a current between the third pixel electrode PE3 and the fourth pixel electrode PE4, a display medium of the second display medium layer DM2 can be determined. The second display medium layer DM2 may include a bistable (or multi-stable) display medium, such as a liquid crystal, E-Ink, a cholesteric liquid crystal, an EPD, or an EWD.

In the present embodiment, as shown in FIG. 1, the pixel electrode PE3 is disposed on the substrate SUB (e.g., disposed in a first conductive layer M1), whereas the pixel electrode PE4 and the display medium layer DM2 are disposed beneath the substrate SUB.

Figure 2:
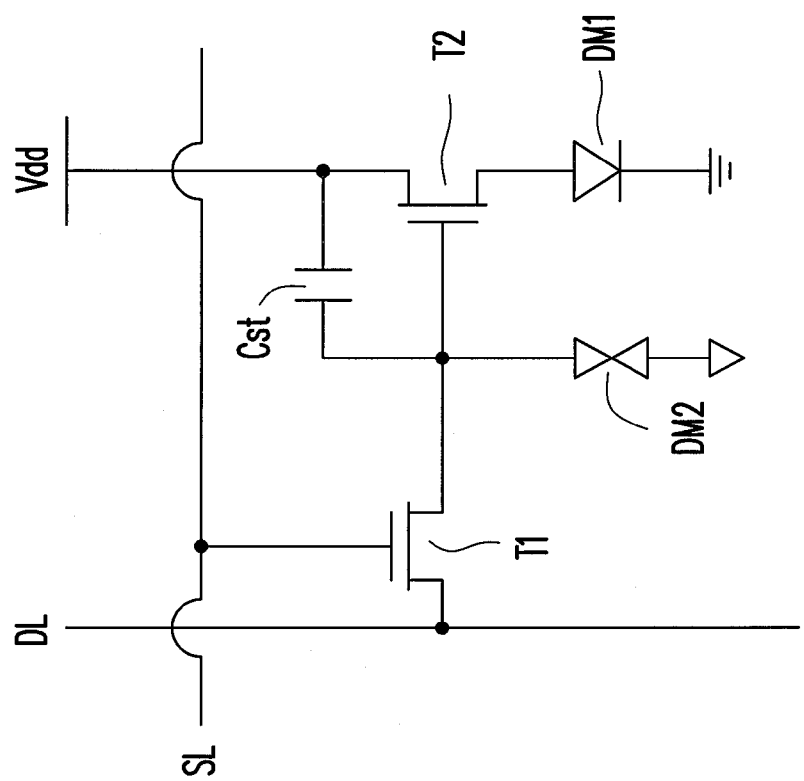
FIG. 2 is an equivalent circuit diagram illustrating the pixel structure depicted in FIG. 1 according to an exemplary embodiment.

FIG. 2 is an equivalent circuit diagram illustrating the pixel structure depicted in FIG. 1 according to an exemplary embodiment. The first display medium layer DM1 has the first pixel electrode PE1 and the second pixel electrode PE2. The second display medium layer DM2 has the third pixel electrode PE3 and the fourth pixel electrode PE4.

Referring to FIGS. 1 and 2 together, the scan line SL and the data line DL are disposed crossing each other on the substrate SUB. The first TFT T1 and the second TFT T2 are disposed on the substrate SUB. A control terminal 105 (e.g., a gate) of the first TFT T1 is electrically connected to the scan line SL, a first terminal 106 (e.g., a source) of the first TFT T1 is electrically connected to the data line DL, and a second terminal 107 (e.g., a drain) of the first TFT T1 is electrically connected to the third pixel electrode PE3 for driving the second display medium layer DM2. A semiconductor layer 108 (e.g., an active layer) overlaps between the first terminal 106 and the second terminal 107, so as to provide a channel between the first terminal 106 and the second terminal 107.

A control terminal 101 (e.g., a gate) of the second TFT T2 is electrically connected to the second terminal 107 of the first TFT T1, and a first terminal 103 (e.g., a source) of the second TFT T2 is electrically connected to the first pixel electrode PE1 for driving the first display medium layer DM1. In the present embodiment, a second terminal 102 (e.g., a drain) of the second TFT T2 is electrically connected to a first power voltage Vdd, whereas the second pixel electrode PE2 is electrically connected to a second power voltage (e.g., a ground voltage). A semiconductor layer 104 overlaps between first terminal 103 and the second terminal 102, so as to provide a channel between the first terminal 103 and the second terminal 102.

The storage capacitor Cst is disposed on the substrate SUB. On a vertical direction of the substrate SUB, the first pixel electrode PE1 overlaps a portion or all of the storage capacitor Cst. The storage capacitor Cst has a first capacitor electrode CE1 and a second capacitor electrode CE2. The first capacitor electrode CE1 is electrically connected to the second terminal 107 of the first TFT T1. The second capacitor electrode CE2 is electrically connected to the first power voltage Vdd. In other embodiments of the disclosure, the second capacitor electrode CE2 may be electrically connected to other reference voltages, such as a ground voltage or a common voltage. The third pixel electrode PE3 and the second capacitor electrode CE2 are disposed in the first conductive layer M1. The first capacitor electrode CE1, the control terminal 105 of the first TFT T1, and the control terminal 101 of the second TFT T2 are disposed in the second conductive layer M2. The first terminal 106 and second terminal 107 of the first TFT T1, and the first terminal 103 and the second terminal 102 of the second TFT T2 are disposed in the third conductive layer M3.

The first pixel electrode PE1, the second pixel electrode PE2, the third pixel electrode PE3, and/or the fourth pixel electrode PE4 may be implemented by a transparent conductive material, such as indium tin oxide (ITO), indium zinc oxide (IZO), aluminum doped zinc oxide (AZO), a transparent carbon nanotube (CNT) film or a transparent nano metal film.

In an embodiment for a double-sided display, the first display medium layer DM1 may include an OLED, whereas the second display medium layer DM2 may include a bistable display medium (e.g., an EPD). The user can view the first display medium layer DM1 above the pixel structure 100, and the user can also view the second display medium layer DM2 beneath the pixel structure 100. In other words, the front and back sides of the pixel arrays in the pixel structure 100 can respectively render a same or a different image. In this embodiment, the first pixel electrode PE1 and/or the third pixel electrode PE3 may be implemented by using an opaque conductive material (e.g., a metal).

In an embodiment for a single-sided display, the first display medium layer DM1 may be a LED or an OLED, whereas the second display medium layer DM2 may be a liquid crystal. Since the OLED can serve as a backlight source for the liquid crystal, the user can view the second display medium layer DM2 from beneath the pixel structure 100. In other words, because each of the liquid crystal pixel arrays in the pixel structure 100 can respectively provide its own backlight source, a backlight module for a conventional liquid crystal display panel can be omitted, and a polarizer film may not be required. When a color (e.g., red, green, or blue) OLED is selected as the first display medium layer DM1, the liquid crystal pixel arrays in the pixel structure 100 may not be required to employ a color filter film. Moreover, since each of the pixels is configured with a backlight source, the liquid crystal pixel arrays in the pixel structure 100 can achieve dynamic backlight luminance, enhance the contrast and save energy. In accordance with the present embodiment, the second pixel electrode PE2 can be implemented by an opaque conductive material (e.g., a metal).

In the embodiment for the single-sided display, the first display medium layer DM1 may include a LED, whereas the second display medium layer DM2 may include a bistable display medium (e.g., an EPD). A color filter film may be disposed on the second pixel electrode PE2. The user can view the first display medium layer DM1 and the second display medium layer DM2 above the pixel structure 100. In other words, the liquid crystal pixel arrays in the pixel structure 100 may also serve as an OLED display panel. When the OLED is in a display mode, the EPD can be set in a black state beforehand so as to increase the contrast of the OLED. When the OLED is turned off, the liquid crystal pixel arrays in the pixel structure 100 may serve as a color EPD. In accordance with the present embodiment, the fourth pixel electrode PE4 may be implemented by an opaque conductive material (e.g., a metal).

Referring to FIGS. 1 and 2 together, a scan driver (not drawn) can turn on the first TFT T1 of the pixel structure 100 through the scan line SL. During a period when the first TFT T1 is turned on, a data driver (not drawn) can write pixel data in the storage capacitor Cst through the data line DL and the first TFT T1. In accordance to the characteristics of the first display medium layer DM1 and the second display medium layer DM2, the pixel data stored in the storage capacitor Cst may simultaneously drive the display medium layers DM1 and DM2, or drive one of the display medium layers DM1 and DM2. For example, when the display medium layers DM1 and DM2 are respectively an OLED and a liquid crystal, a brightness of the OLED and a gray level of the liquid crystal are altered according to changes in the pixel data, such that the liquid crystal arrays in the pixel structure 100 can achieve dynamic backlight luminance, enhance the contrast and save energy.

In the present embodiment, the display medium layers DM1 and DM2 are respectively an OLED and a bistable display medium (e.g., a cholesteric liquid crystal), and the display medium layers DM1 and DM2 may be driven in different time without interfering each other. Since the bistable display medium layer does not require repeated driving sequences to maintain a displayed image thereon, a high voltage (e.g., 30-40 V) can be applied to drive the display medium layer DM2 to a bright state or a dark state in advance. Due to a driving voltage of the second TFT T2 is smaller than a driving voltage of the bistable display medium, when the data driver (not drawn) alters the brightness of the display medium layer DM1 (having the OLED) by driving the second TFT T2 through the data line DL and the first TFT T1, since the driving voltage of the second TFT T2 is far smaller than the driving voltage of the display medium layer DM2, in the process of driving the display medium layer DM1, the display condition of the display medium layer DM2 is not affected. Accordingly, the front and back sides of the pixel arrays in the pixel structure 100 can respectively render a different image.

In the present embodiment, the first capacitor electrode CE1 and the second capacitor electrode CE2 of the storage capacitor Cst are disposed in the conductive layers M1 and M2. The first pixel electrode PE1 and the second pixel electrode PE2 of the first display medium layer DM1 are disposed in the conductive layers M4 and M5. Therefore, on a vertical direction of the substrate SUB, the first pixel electrode PE1 can overlap a portion or all of the storage capacitor Cst. Accordingly, the pixel structure 100 according to the present embodiment can enlarge an aperture ratio of the first display medium layer DM1.

Figure 3:
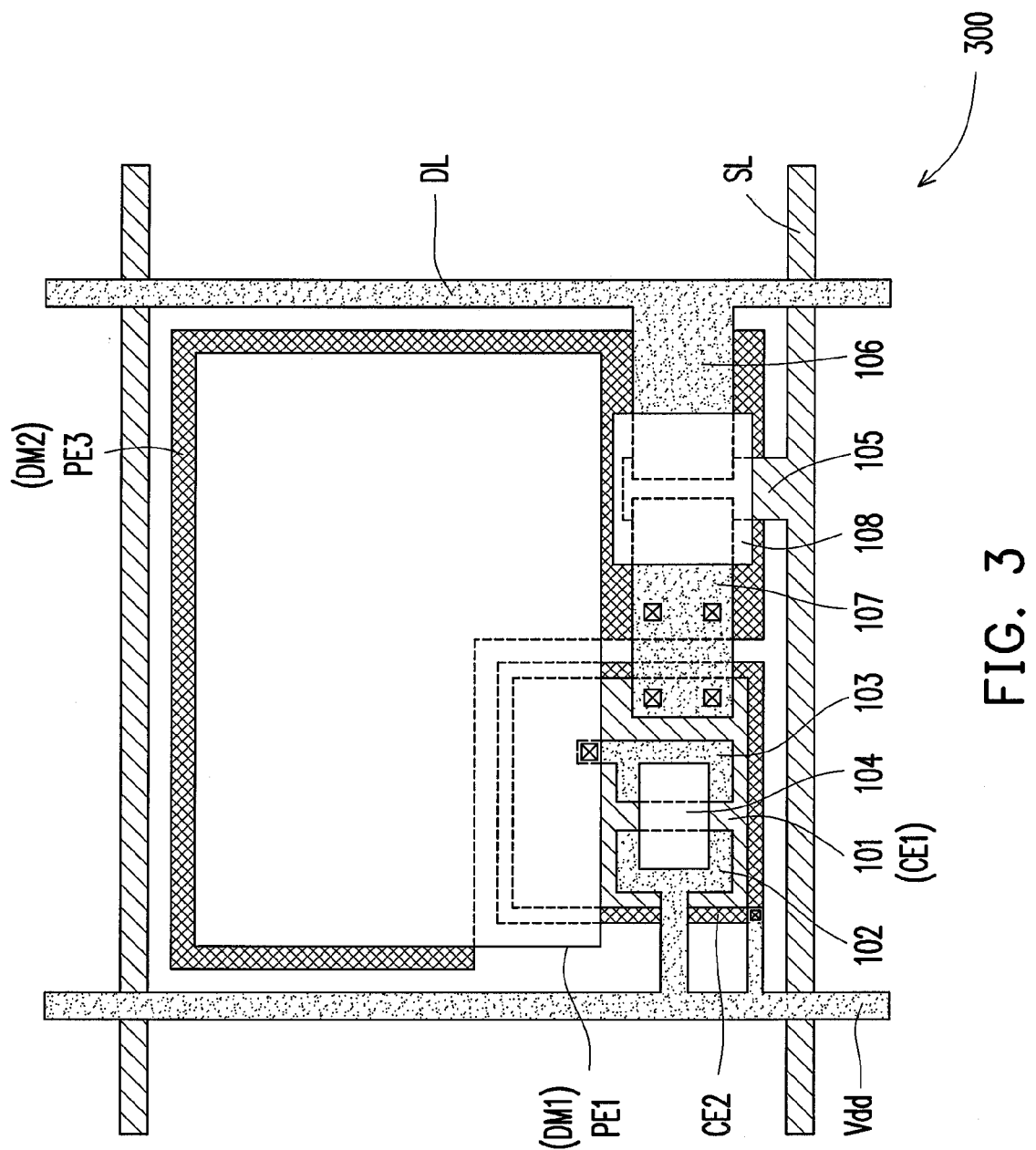
FIG. 3 is a schematic top view illustrating a pixel structure according to another exemplary embodiment.

FIG. 3 is a schematic top view illustrating a pixel structure 300 according to another exemplary embodiment. It should be noted that the same or similar reference numbers used in FIG. 3 and in FIG. 1 represent the same or the like elements. Accordingly, since a description of FIG. 3 can be obtained by referring to the foregoing description of FIG. 1, further explanation thereof is not repeated hereafter. As clearly shown in FIG. 3, the storage capacitor Cst and the first pixel electrode PE1 (or the display medium layer DM1) are respectively disposed in different conductive layers. Therefore, the first pixel electrode PE1 can overlap the storage capacitor Cst. Accordingly, an area of the first pixel electrode PE1 (or the display medium layer DM1) may be increased, thereby enlarging an aperture ratio thereof. Furthermore, when the first capacitor electrode CE1 and the second capacitor electrode CE2 of the storage capacitor Cst employ transparent conductive materials, then the pixel structures 100 and 300 may be applied in a pixel design of a transmissive display, thereby further enhancing the aperture ratio of the pixel.

Figure 4A:
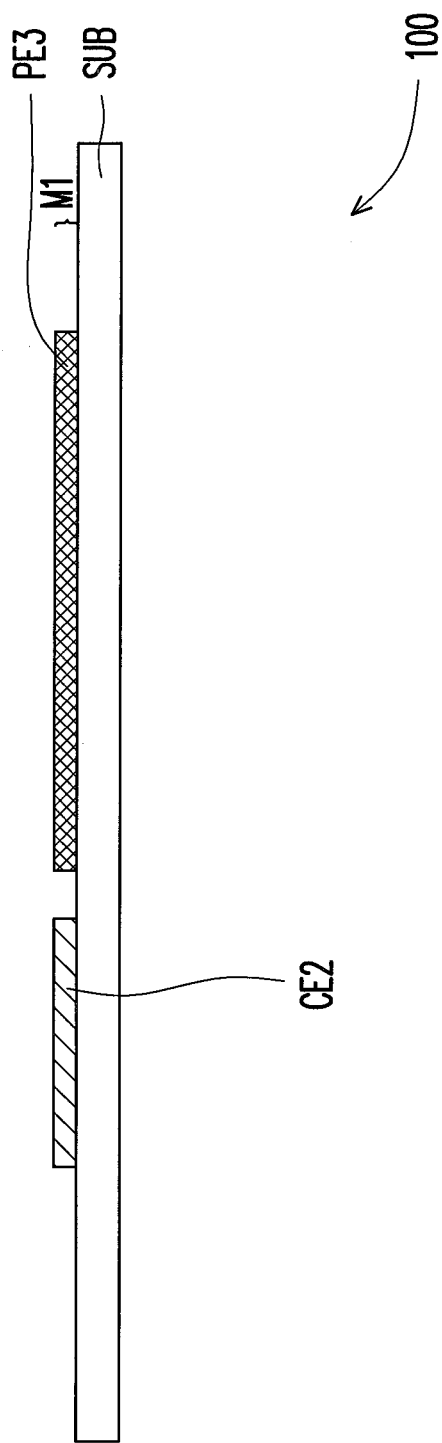
FIGS. 4A-4D are schematic views illustrating a fabrication process of the pixel structure depicted in FIG. 1.

A fabrication process of the pixel structures 100 and 300 are described hereafter. FIGS. 4A-4D are schematic views illustrating a fabrication process of the pixel structure 100 depicted in FIG. 1. FIGS. 5A-5D are schematic views illustrating a fabrication process of the pixel structure 300 depicted in FIG. 3. Referring to FIG. 4A or 5A, a substrate SUB is provided. The substrate SUB may be a glass or a flexible substrate, such as a metal foil or a plastic substrate. Thereafter, a first conductive layer M1 is disposed on the substrate SUB and patterned, so as to form the third pixel electrode PE3 and the second capacitor electrode CE2. A material of the third pixel electrode PE3 and/or the second capacitor electrode CE2 mainly comprises of a low resistance material (e.g., Al, Cu, or Ag) or a composite material (e.g., Ti/Al/Ti or Mo/Al), and a film thickness of the first conductive layer M1 is approximately 100-300 nm. The first conductive layer M1 may be fabricated by a sputtering process in combination with a yellow light photolithography and etching process.

Figure 4B:
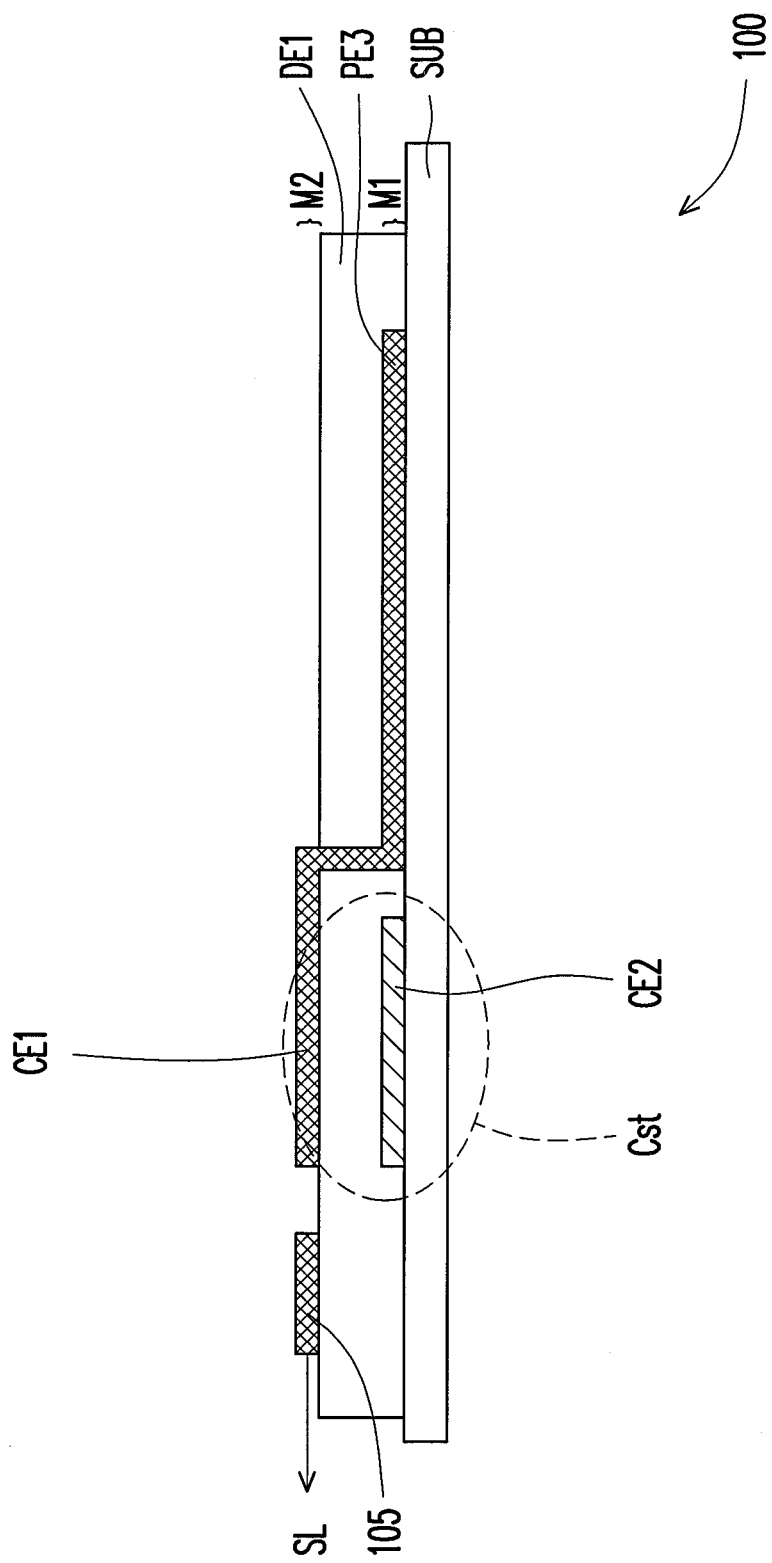
Figure 5B:
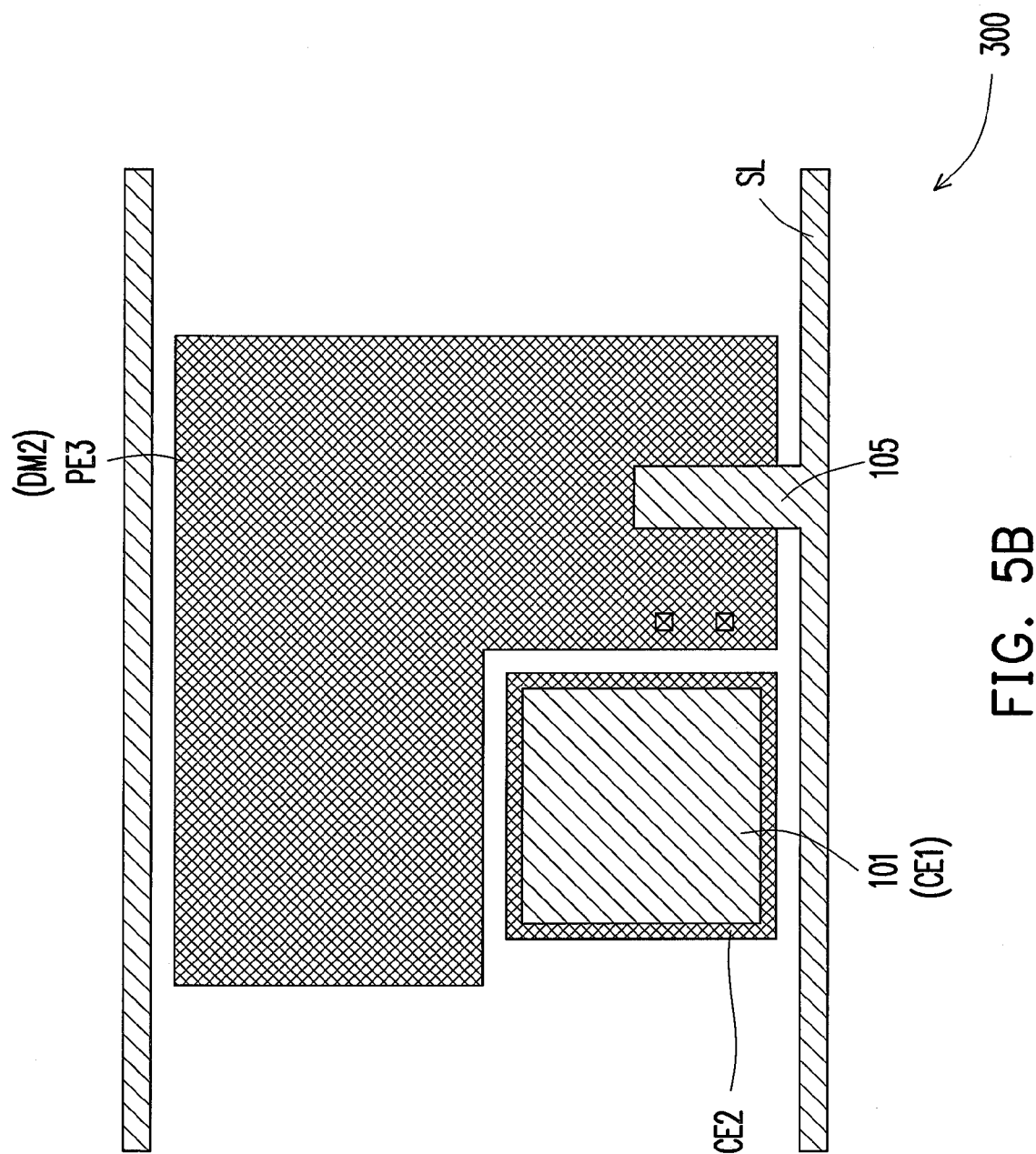

Referring to FIG. 4B or 5B, a first insulating layer DE1 is then disposed on the first conductive layer M1 and patternized, so as to selectively form a via. A material of the first insulating layer DE1 may comprise of an organic, inorganic, or an hybrid material, such as $SiO_2$, SiNx, SiON, a polyimide-based material, or an acrylic-based material. A thickness of the first insulating layer DE1 is approximately 50-500 nm. The first insulating layer DE1 may be fabricated by a chemical vapor deposition (CVD) process, a sputtering process, a spin coating process, or a coating process.

A second conductive layer M2 is thereafter disposed on the first insulating layer DE1 and patternized, so as to form the first capacitor electrode CE1, the control terminal 105 of the first TFT T1, the control terminal 101 of the second TFT T2, and the scan line SL, as well as to form a via plug in the via of the first insulating layer DEL On a vertical direction of the substrate SUB, the first capacitor electrode CE1 is stacked on the second capacitor CE2 so as to form the storage capacitor Cst. The material, film thickness, and fabrication process of the second conductive layer M2 may be the same as the first conductive layer M1.

Figure 4C:
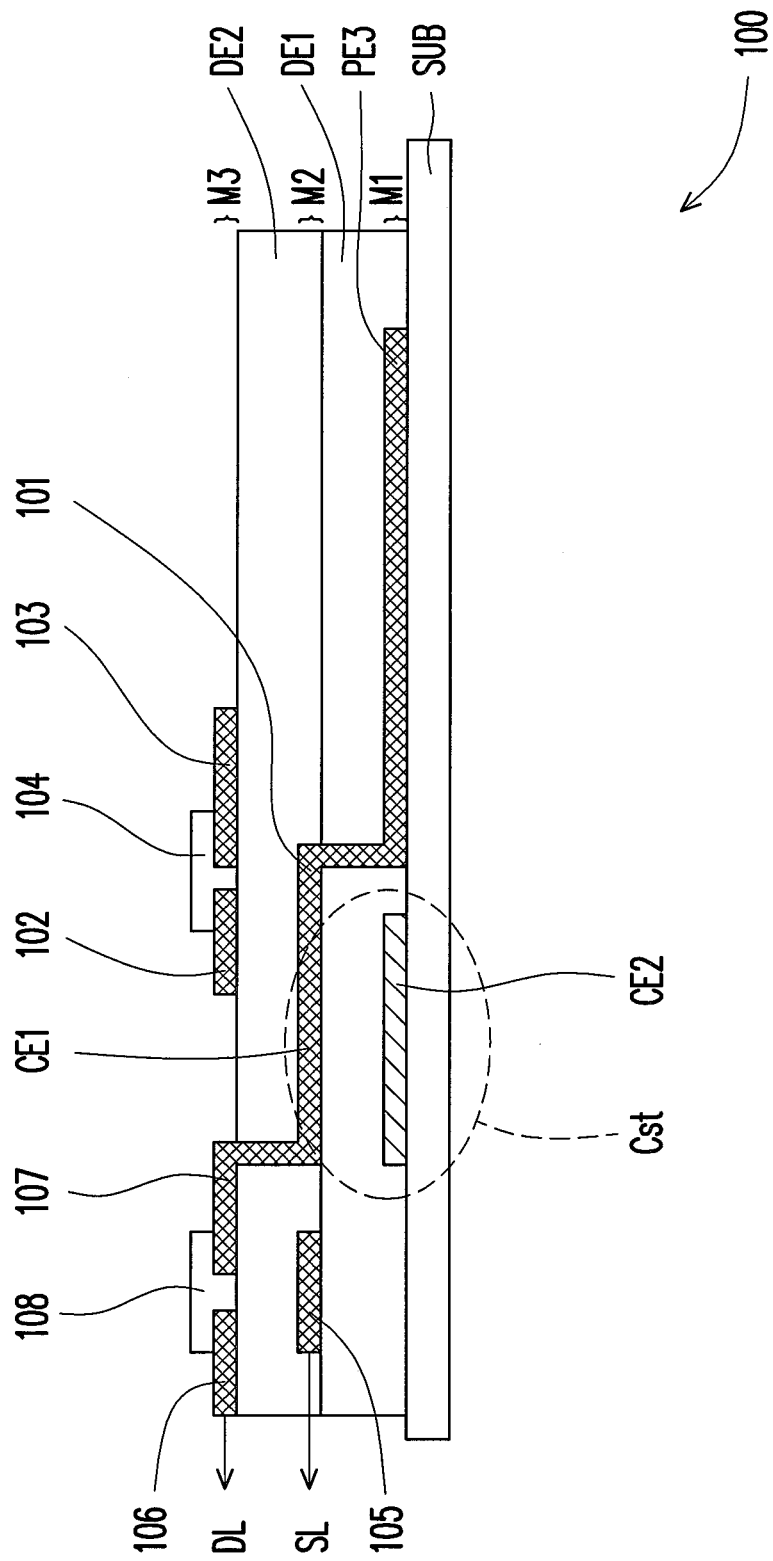
Figure 5C:
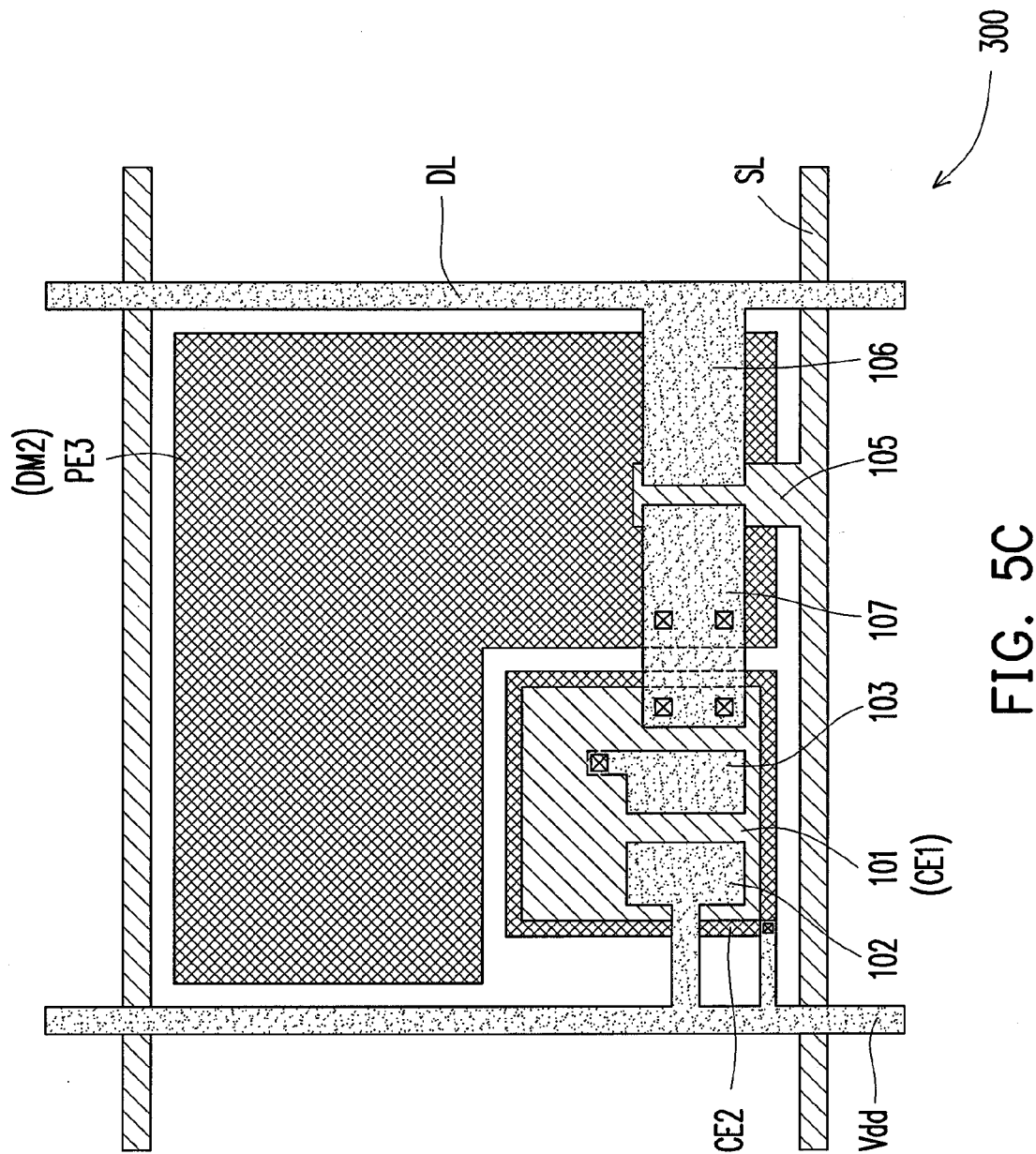

Referring to FIG. 4C or 5C, a second insulating layer DE2 is then disposed on the second conductive layer M2 and patternized, so as to selectively form a via. The material, film thickness, and fabrication process of the second insulating layer DE2 may be the same as the first insulating layer DE1. A third conductive layer M3 is then disposed on the second insulating layer DE2 and patternized, so as to form the first terminal 106 and the second terminal 107 of the first TFT T1, the first terminal 103 and the second terminal 102 of the second TFT T2, and to form a via plug in the via of the second insulating layer DE2. The material, film thickness, and fabrication process of the third conductive layer M3 may be the same as the first conductive layer M1.

Figure 5D:
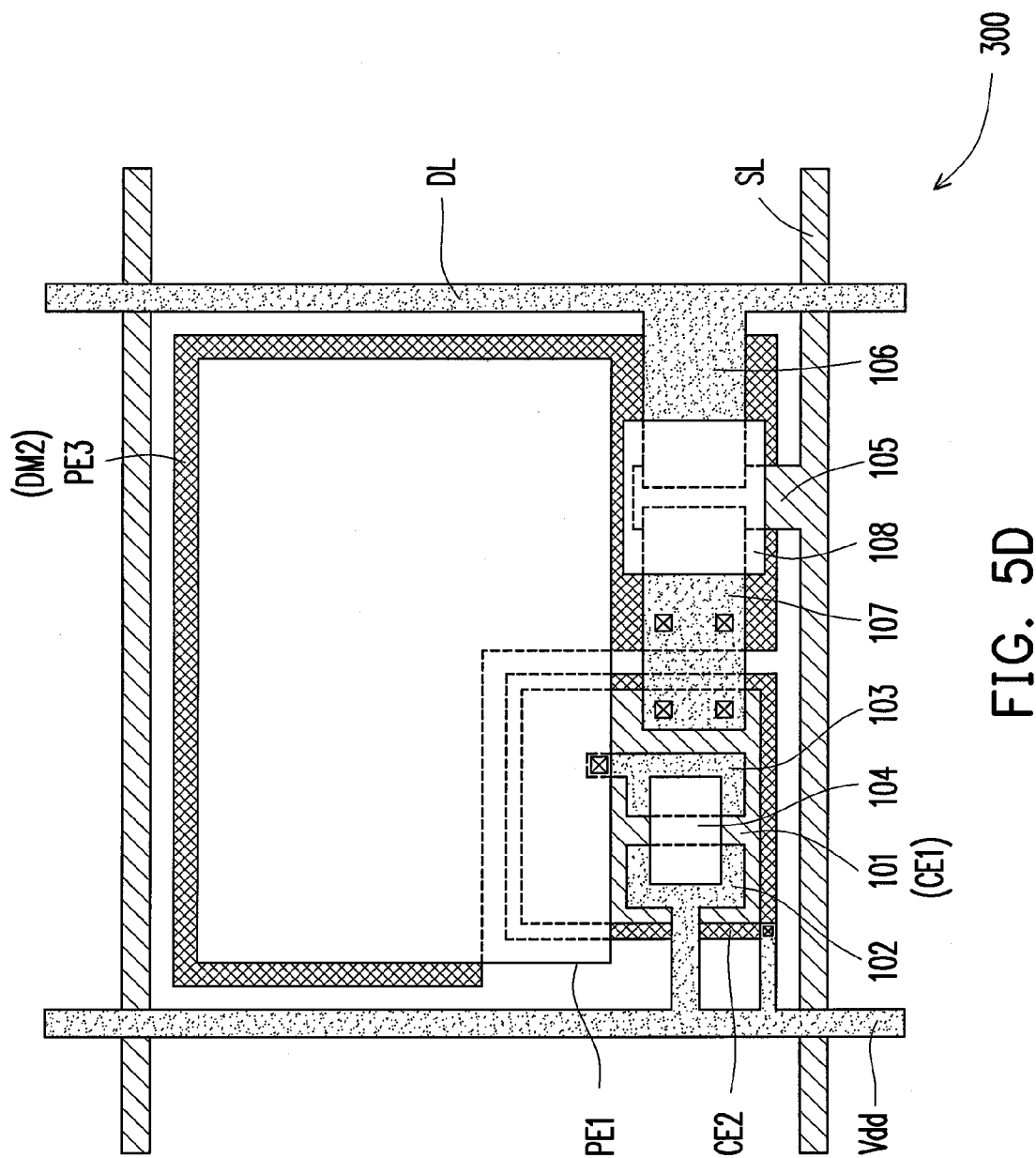

Thereafter, the semiconductor layers 108 (active layer) and 104 are disposed on the third conductive layer, as shown in FIG. 4C or 5D. At this point, fabrication of the TFTs T1 and T2 is complete.

Figure 4D:
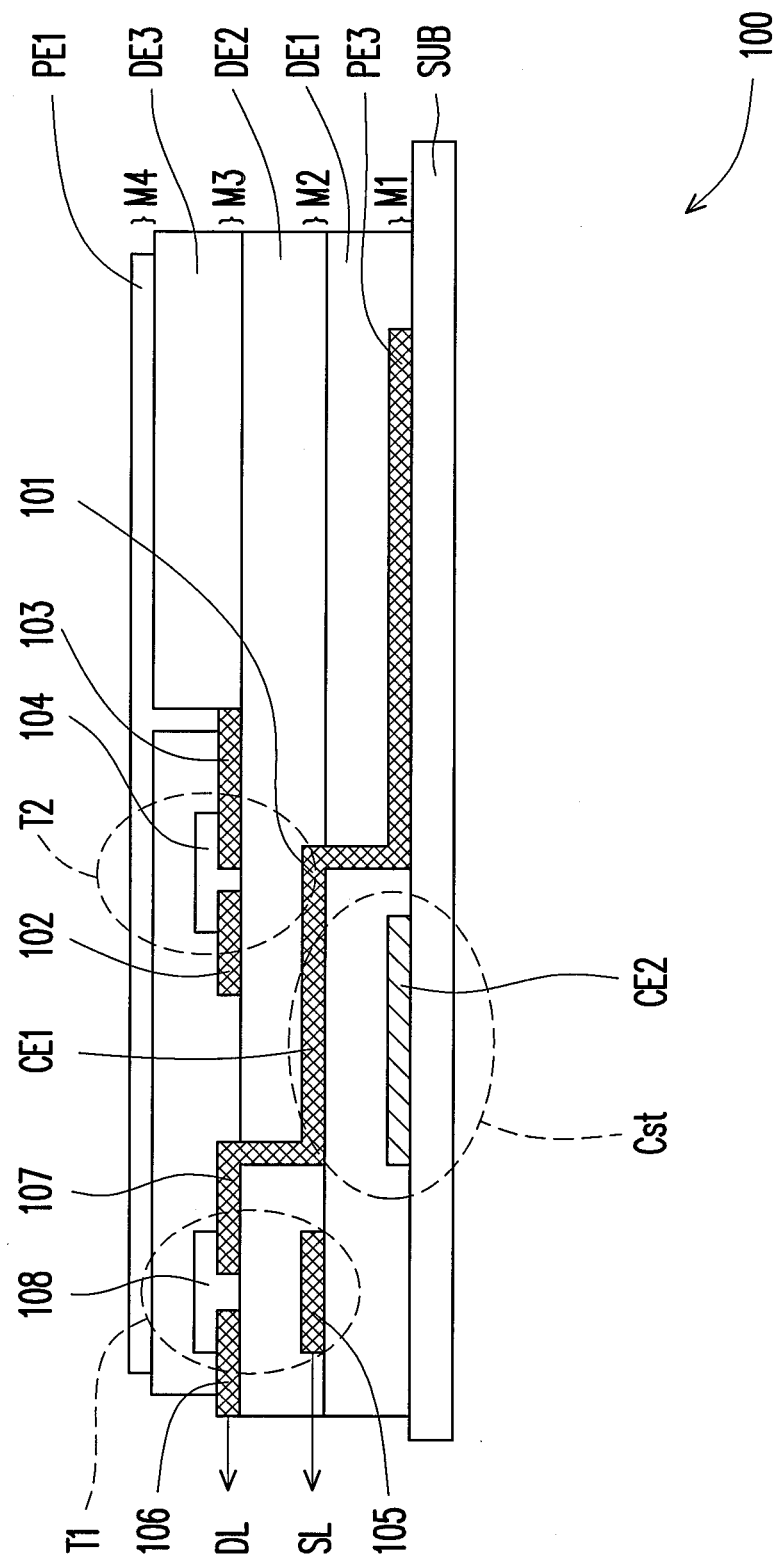

Referring to FIG. 4D or 5D, a third insulating layer DE3 is disposed on the third conductive layer M3 and the semiconductor layers 108 (active layer) and 104. Moreover, the third insulating layer DE3 is patternized so as to selectively form a via. The material, film thickness, and fabrication process of the third insulating layer DE3 may be the same as the second insulating layer DE2. A fourth conductive layer M4 is then disposed on the third insulating layer DE3 and patternized, so as to form the first pixel electrode PE1. In some embodiments of the disclosure, the material, film thickness, and fabrication process of the fourth conductive layer M4 may be the same as the first conductive layer M1. In the present embodiment, the material of the fourth conductive layer M4 is different from the material of the conductive layers M1, M2, or M3. For example, the present embodiment employs a transparent conductive material to implement the first pixel electrode PE1. The first pixel electrode PE1 can be electrically connected to the first terminal 103 of the second TFT T2 through the via of the third insulating layer DE3.

Referring to FIG. 1, a fourth insulating layer DE4 is thereafter disposed on the fourth conductive layer M4 and patternized, so as to form a via above the first pixel electrode PE1. The via is used for containing the first display medium layer DM1. The material and the fabrication process of the fourth insulating layer DE4 may be the same as the first insulating layer DE1, and the film thickness of the fourth insulating layer DE4 is determined according to the thickness of the first display medium layer DM1. After the disposition of the first display medium layer DM1 on the first pixel electrode PE1, a fifth conductive layer M5 is disposed on the fourth insulating layer DE4 and patternized, so as to form the second pixel electrode PE2.

After completing the fabrication process above the substrate SUB, the second display medium layer DM2 and the fourth pixel electrode PE4 are then disposed beneath the substrate SUB. It should be noted that, in some embodiments of the disclosure, the third pixel electrode PE3, the second display medium layer DM2, and the fourth pixel electrode PE4 may be omitted due to a design requirement.

Figure 6A:
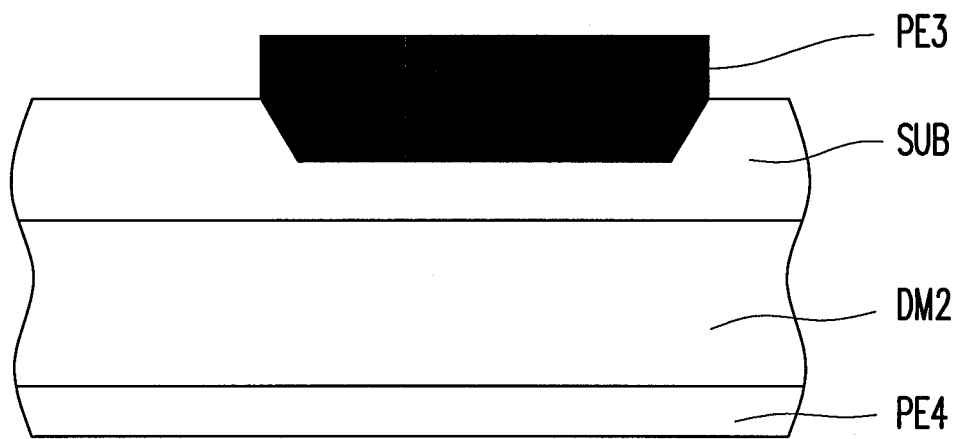
FIGS. 6A and 6B respectively illustrate different implementations for reducing a thickness of the substrate SUB according to an exemplary embodiment.
Figure 6B:
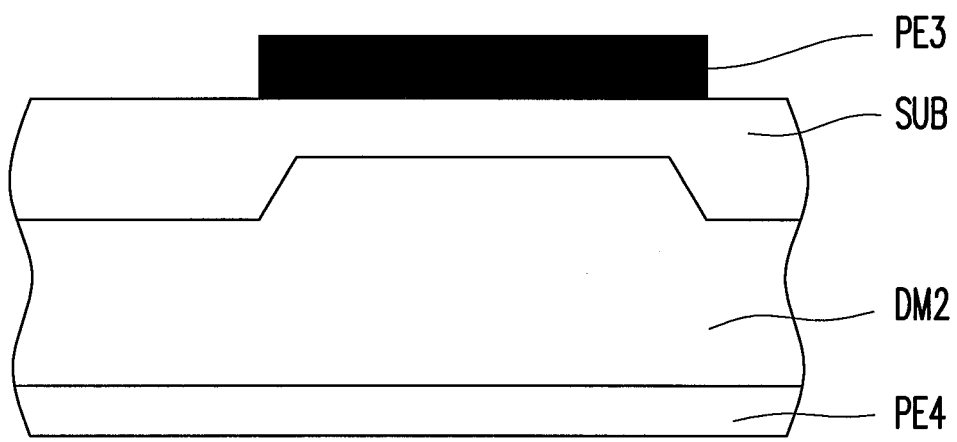

In order to enhance the control of the driving voltage of the third pixel electrode PE3 on the display medium DM2 of the bottom of the substrate SUB, the thickness of the substrate SUB may be reduced to achieve this technical effect. For example, FIGS. 6A and 6B respectively illustrate different implementations for reducing a thickness of the substrate SUB according to an exemplary embodiment. As shown in FIG. 6A, a recessed portion may be formed in an upper side of the substrate SUB by a physical or chemical process, so as to contain the third pixel electrode PE3. Alternatively, as shown in FIG. 6B, a recessed portion may be formed in an lower side of the substrate SUB by a physical or chemical process, and a recessed portion is formed at a corresponding location of the third pixel electrode PE3.

Figure 7A:
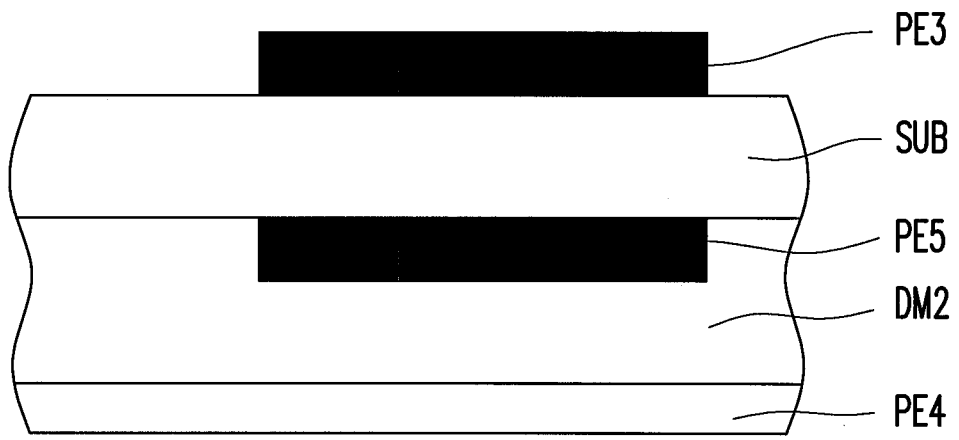
FIGS. 7A and 7B respectively illustrate different implementations for increasing pixel electrodes according to an exemplary embodiment.
Figure 7B:
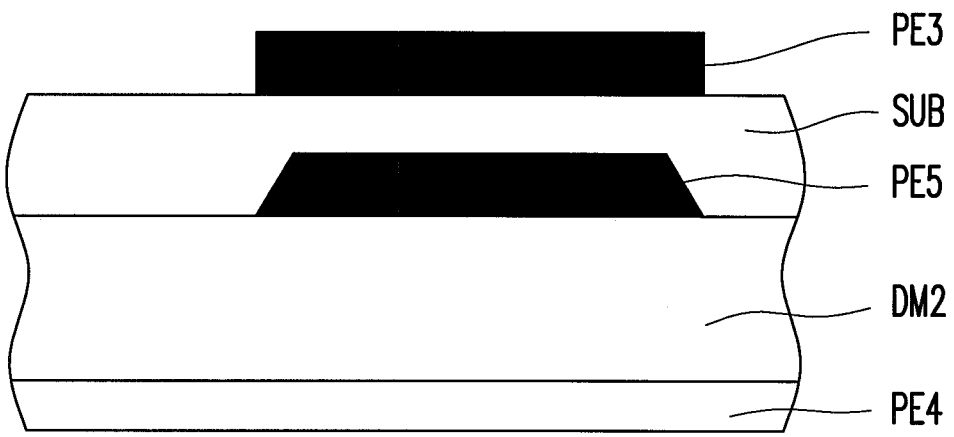

Other implementations for enhancing the control of the driving voltage of the third pixel electrode PE3 on the display medium DM2 of the bottom of the substrate SUB are described hereafter. FIGS. 7A and 7B respectively illustrate different implementations for increasing pixel electrodes according to an exemplary embodiment. As shown in FIG. 7A, a fifth pixel electrode PE5 is disposed between the substrate SUB and the second display medium layer DM2, that is to say, beneath the substrate SUB and at a corresponding location of the third pixel electrode PE3. The two pixel electrodes PE3 and PE5 form a capacitive structure for enhancing a voltage control of the display medium DM2. Alternatively, as shown in FIG. 7B, a recessed portion may be formed in an lower side of the substrate SUB by a physical or chemical process, and a recessed portion is formed at a corresponding location of the third pixel electrode PE3, with the fifth pixel electrode PE5 contained in the recessed portion.

Although transmission lines are not drawn for the aforedescribed pixel structure 100, an implementation of the transmission lines of the power voltage Vdd can be referred to in FIG. 3. However, the transmission lines of the power voltage Vdd would occupy a portion of the area of the pixel structure 100. Another embodiment is described hereafter, where the added conductive layers replace the original transmission lines of the power voltage Vdd.

Figure 8:
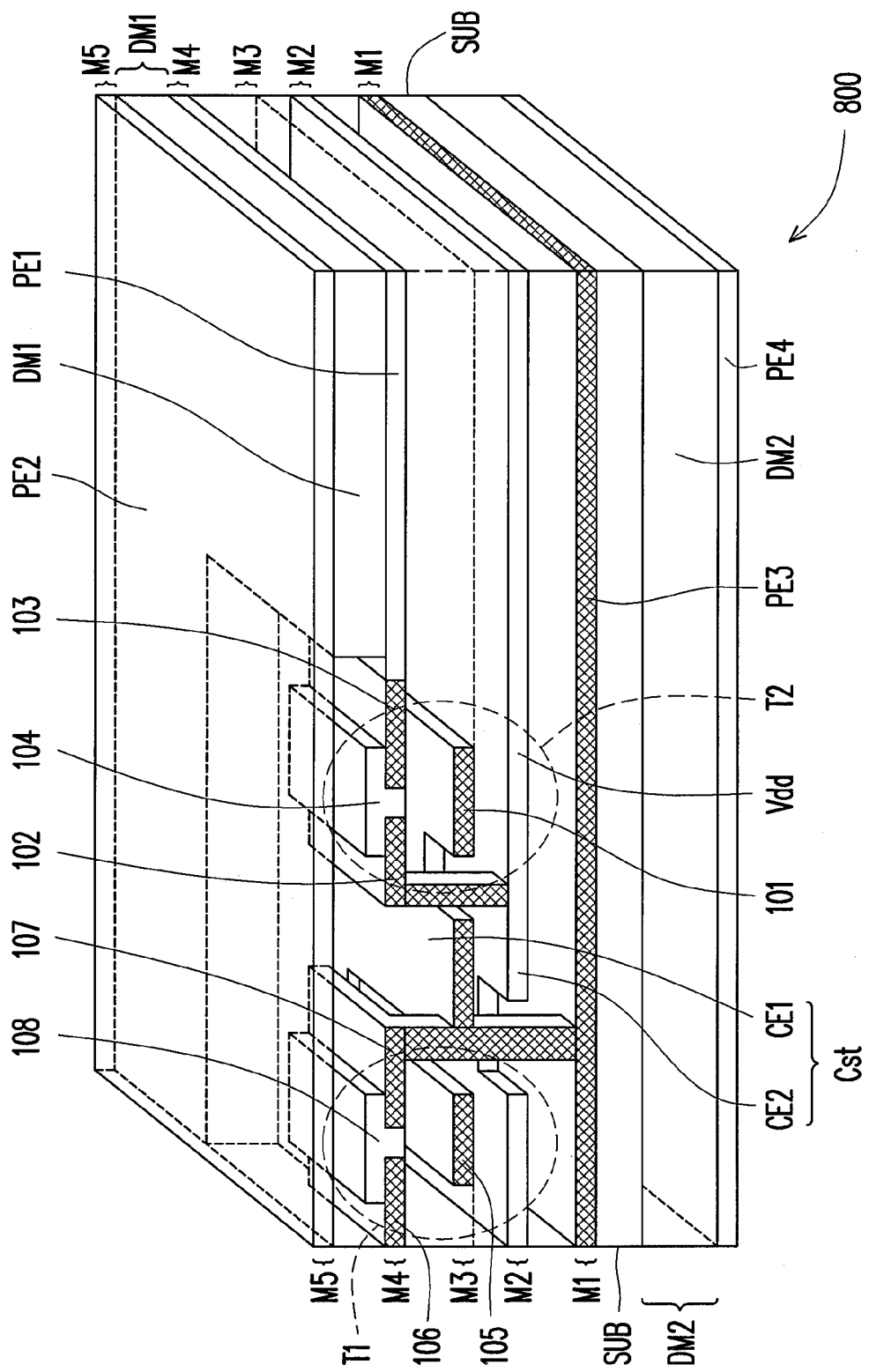
FIG. 8 is a perspective cross-sectional view illustrating a pixel structure according to another exemplary embodiment.

FIG. 8 is a perspective cross-sectional view illustrating a pixel structure 800 according to another exemplary embodiment. It should be noted that the same or similar reference numbers used in FIG. 8 and in FIG. 1 represent the same or the like elements. Accordingly, since a description of FIG. 8 can be obtained by referring to the foregoing description of FIG. 1, further explanation thereof is not repeated hereafter. A difference between the pixel structures 800 and 100 is that a common conductive layer is further disposed between the conductive layers M1 and M2 of the pixel structure 100. The common conductive layer is disposed between the first pixel electrode PE1 and the substrate SUB. A total of five conductive layers M1, M2, M3, M4, and M5 are disposed in the pixel structure 800, and the aforesaid common conductive layer is disposed in the conductive layer M2. An insulating layer is disposed between each of the conductive layers.

Referring to FIG. 8, the third pixel electrode PE3 is disposed in the first conductive layer M1. The first capacitor electrode CE1, the control terminal 105 of the first TFT T1, and the control terminal of the second TFT T2 are disposed in the third conductive layer M3. The first pixel electrode PE1, the first terminal 106 of the first TFT T1, the second terminal 107 of the first TFT T1, the first terminal 103 of the second TFT T2, and the second terminal 102 of the second TFT T2 are disposed in the fourth conductive layer M4. The second terminal 102 of the second TFT T2 is electrically connected to the common conductive layer (e.g., the second conductive layer M2) by the via plug. It should be noted that, according to a design requirement, a user of the present embodiment may choose to omit the first conductive layer M1. In other words, the third pixel electrode PE3, the second display medium layer DM2, and the fourth pixel electrode PE4 may be omitted in light of the design requirement.

In the present embodiment, the second capacitor electrode CE2 is disposed in the second conductive layer M2 (e.g., the common conductive layer). Moreover, in the present embodiment, the entire second conductive layer M2 is used to transmit the first power voltage (e.g., the power voltage Vdd). A material of the second conductive layer may comprise any conductive materials, such as a transparent conductive material or a transparent conductive oxide (TCO). In some embodiments of the disclosure, the second conductive layer M2 may be an indium tin oxide (ITO) layer. By modifying a transmission route of the power voltage Vdd under the transistors, the area of the transmission lines in the pixels can be reduced, thereby enlarging the aperture ratio. Furthermore, in the embodiment using transparent conductive materials to implement the second conductive layer M2, a metal electrode may also be deposited on the transparent conductive materials, so as to enhance the conductivity and the bending tolerance of the second conductive layer M2.

In the present embodiment, a light beam does not need to transmit through the pixel structure 800. For example, the first display medium layer DM1 comprises a light emitting material such as an OLED. In accordance with this embodiment, the common conductive layer (e.g., the second conductive layer M2) may be implemented by an opaque conductive material (e.g., a metal).

In view of the foregoing, according to the embodiments broadly described herein, the storage capacitor Cst and the first pixel electrode PE1 are disposed in different layers, so as to overlap a portion or all of the storage capacitor Cst with the first pixel electrode PE1. Accordingly, the area of the first display medium layer DM1 can be increased, thereby enlarging the aperture ratio of the pixel. Moreover, since the third pixel electrode PE3 is disposed in the first conductive layer M1, the third pixel electrode PE3 can control/drive the second display medium layer DM2 that is under the substrate SUB. Therefore, the pixel structure disclosed in the afore-described embodiments can use a same pixel circuit to drive a plurality of display mediums, while enlarging the aperture ratio of the pixel at the same time.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A pixel structure, comprising:
 a substrate;
 a first pixel electrode and a second pixel electrode disposed in parallel on the substrate;
 a first display medium layer disposed between the first pixel electrode and the second pixel electrode;
 a third pixel electrode and a fourth pixel electrode disposed in parallel with the substrate;
 a second display medium layer disposed between the third pixel electrode and the fourth pixel electrode;
 a first thin film transistor (TFT) disposed on the substrate, wherein a control terminal of the first TFT is electrically connected to a scan line, a first terminal of the first TFT is electrically connected to a data line, and a second terminal of the first TFT is electrically connected to the third pixel electrode;
 a second TFT disposed on the substrate, wherein a control terminal of the second TFT is electrically connected to the second terminal of the first TFT, and a first terminal of the second TFT is electrically connected to the first pixel electrode; and
 a storage capacitor disposed on the substrate, the first pixel electrode overlapping a portion or all of the storage capacitor on a vertical direction of the substrate, and the storage capacitor having a first capacitor electrode and a second capacitor electrode, wherein the first capacitor electrode is electrically connected to the second terminal of the first TFT.

2. The pixel structure as claimed in claim 1, wherein the first display medium layer comprises a light emitting diode (LED), an organic light emitting diode (OLED), a liquid crystal, a bistable display medium, an electrophoretic display (EPD), or an electrowetting display (EWD).

3. The pixel structure as claimed in claim 1, wherein the third pixel electrode is disposed on the substrate, the fourth pixel electrode is disposed beneath the substrate, and the second display medium layer is disposed beneath the substrate.

4. The pixel structure as claimed in claim 3, further comprising:
 a fifth pixel electrode disposed between the substrate and the second display medium layer.

5. The pixel structure as claimed in claim 4, wherein a lower side of the substrate has a recessed portion to contain the fifth pixel electrode.

6. The pixel structure as claimed in claim 3, wherein an upper side of the substrate has a recessed portion to contain the third pixel electrode.

7. The pixel structure as claimed in claim 1, wherein the second display medium layer comprises a liquid crystal, a bistable display medium, an EPD, or an EWD.

8. The pixel structure as claimed in claim 1, wherein the third pixel electrode and the second capacitor electrode are disposed in a first conductive layer, the first capacitor electrode, the control terminal of the first TFT, and the control terminal of the second TFT are disposed in a second conductive layer, the first terminal of the first TFT, the second terminal of the first TFT, the first terminal of the second TFT, and the second terminal of the second TFT are disposed in a third conductive layer, and the first pixel electrode is disposed in a fourth conductive layer.

9. The pixel structure as claimed in claim 1, wherein the second terminal of the second TFT is electrically connected to a first power voltage.

10. The pixel structure as claimed in claim 1, wherein the second pixel electrode is electrically connected to a second power voltage.

11. The pixel structure as claimed in claim 10, wherein the second power voltage is a ground voltage.

12. The pixel structure as claimed in claim 1, wherein the second capacitor electrode is electrically connected to a first power voltage.

13. A pixel structure, comprising:
 a substrate;
 a first conductive layer disposed in parallel on the substrate;
 a first insulating layer disposed in parallel on the first conductive layer;
 a second conductive layer disposed in parallel on the first insulating layer;
 a second insulating layer disposed in parallel on the second conductive layer;

a third conductive layer disposed in parallel on the second insulating layer;

a third insulating layer disposed in parallel on the third conductive layer;

a fourth conductive layer disposed in parallel on the third insulating layer;

a fourth insulating layer disposed in parallel on the fourth conductive layer;

a fifth conductive layer disposed in parallel on the fourth insulating layer;

a common conductive layer disposed in the second conductive layer;

a first pixel electrode disposed in the fourth conductive layer;

a second pixel electrode disposed in the fifth conductive layer, wherein the second pixel electrode overlaps a portion or all of the first pixel electrode on a vertical direction of the substrate;

a first display medium layer disposed in the fourth insulating layer and between the first pixel electrode and the second pixel electrode;

a storage capacitor disposed on the substrate, having a first capacitor electrode and a second capacitor electrode, wherein the first pixel electrode overlaps a portion or all of the storage capacitor on the vertical direction of the substrate, and the second capacitor electrode is disposed in the common conductive layer;

a first TFT disposed on the substrate, wherein a control terminal of the first TFT is electrically connected to a scan line, a first terminal of the first TFT is electrically connected to a data line, and a second terminal of the first TFT is electrically connected to the first capacitor electrode; and a second TFT disposed on the substrate, wherein a control terminal of the second TFT is electrically connected to the second terminal of the first TFT, a first terminal of the second TFT is electrically connected to the first pixel electrode, and the second terminal of the second TFT is electrically connected to the common conductive layer.

14. The pixel structure as claimed in claim 13, wherein the first display medium layer comprises a LED, an OLED, a liquid crystal, a bistable display medium, an EPD, or an EWD.

15. The pixel structure as claimed in claim 13, wherein a material of the common conductive layer comprises a transparent conductive material or a transparent conductive oxide.

16. The pixel structure as claimed in claim 13, wherein the material of the common conductive layer comprises a metallic material.

17. The pixel structure as claimed in claim 13, wherein the common conductive layer is electrically connected to a first power voltage.

18. The pixel structure as claimed in claim 13, wherein the second pixel electrode is electrically connected to a second power voltage.

19. The pixel structure as claimed in claim 18, wherein the second power voltage is a ground voltage.

20. A pixel circuit having multi-display mediums, comprising:

a first display medium device having a first pixel electrode and a second pixel electrode;

a second display medium device having a third pixel electrode and a fourth pixel electrode;

a scan line;

a data line;

a first TFT having a control terminal electrically connected to the scan line, a first terminal electrically connected to the data line, and a second terminal electrically connected to the third pixel electrode;

a second TFT having a control terminal electrically connected to the second terminal of the first TFT, and a first terminal electrically connected to the first pixel electrode; and a storage capacitor having a first capacitor electrode and a second capacitor electrode, wherein the first capacitor electrode is electrically connected to the second terminal of the first TFT.

21. The pixel circuit having multi-display mediums as claimed in claim 20, wherein the first display medium device comprises a LED, an OLED, a liquid crystal device, a bistable display device, an EPD, or an EWD.

22. The pixel circuit having multi-display mediums as claimed in claim 20, wherein the second display medium device comprises a liquid crystal device, a bistable display medium device, an EPD, or an EWD.

23. The pixel circuit having multi-display mediums as claimed in claim 20, wherein the second terminal of the second TFT is electrically connected to a first power voltage.

24. The pixel circuit having multi-display mediums as claimed in claim 20, wherein the second pixel electrode is electrically connected to a second power voltage.

25. The pixel circuit having multi-display mediums as claimed in claim 24, wherein the second power voltage is a ground voltage.

26. The pixel circuit having multi-display mediums as claimed in claim 20, wherein the second capacitor electrode is electrically connected to a first power voltage.

* * * * *